United States Patent
Dean-Bhïyan et al.

(10) Patent No.: US 10,755,689 B1
(45) Date of Patent: Aug. 25, 2020

(54) AIRCRAFT CABIN SYSTEM WITH DYNAMIC NOISE REDUCTION

(71) Applicant: MITSUBISHI HEAVY INDUSTRIES, LTD., Tokyo (JP)

(72) Inventors: Sasha Dean-Bhïyan, Aichi (JP); Renato Seiji Morita, Aichi (JP); Victor-Daniel Gheorghian, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/503,103

(22) Filed: Jul. 3, 2019

Related U.S. Application Data (60) Provisional application No. 62/826,207, filed on Mar. 29, 2019.

(51) Int. Cl.
*G10K 11/178* (2006.01)
(52) U.S. Cl.
CPC .... *G10K 11/178* (2013.01); *G10K 2210/1281* (2013.01)
(58) Field of Classification Search
CPC .............. G10K 11/178; G10K 11/002; G10K 2210/1281; H04R 2499/13; H04R 1/1083; H04R 2410/05
USPC ........................... 381/71.4, 71.2, 71.8, 71.12
See application file for complete search history.

(56) References Cited

U.S. PATENT DOCUMENTS

| | | | |
|---|---|---|---|
| 9,407,982 | B2 | 8/2016 | Donaldson |
| 2015/0379991 | A1 | 12/2015 | Frauen |
| 2016/0226574 | A1* | 8/2016 | LaMarca ............ H04B 7/18508 |
| 2019/0266472 | A1* | 8/2019 | Johnson .................. H04W 4/38 |
| 2019/0304431 | A1* | 10/2019 | Cardinaux ....... G10K 11/17813 |

\* cited by examiner

*Primary Examiner* — Alexander Krzystan
(74) *Attorney, Agent, or Firm* — Osha Liang LLP (57) ABSTRACT

An aircraft cabin system includes a plurality of modular displays disposed in an cabin and a server connected to each of the modular displays. Each of the plurality of modular displays includes a microphone that captures ambient noise in the cabin and a speaker that emits a noise reduction sound. The server instructs each of the plurality of modular displays to capture the ambient noise during a preselected flight phase. The server receives, from each of the plurality of modular displays, a digital ambient noise signal generated based on the ambient noise. The server generates for each of the plurality of modular displays a digital ambient noise reduction signal with an inverted phase of the digital ambient noise signal and a dynamic amplitude that is calculated to yield a highest level of ambient noise reduction. The server sends the digital ambient noise reduction signal to each of the plurality of modular displays. The speaker emits an ambient noise reduction sound with an inverted phase and a dynamic amplitude based on the digital ambient noise reduction signal.

12 Claims, 8 Drawing Sheets

FIG. 8

AIRCRAFT CABIN SYSTEM WITH DYNAMIC NOISE REDUCTION

BACKGROUND

Technical Field

The present invention generally relates to an aircraft cabin system that performs dynamic noise reduction in an aircraft cabin.

Description of Related Art

During flight, ambient noise in the cabin may cause discomfort for passengers. Furthermore, a level of ambient noise in the cabin may fluctuate in accordance with flight phases. To reduce the negative effects of ambient noise in the cabin, a dynamic noise reduction system may be used during each flight phase.

SUMMARY

One or more embodiments of the present invention provide an aircraft cabin system that includes a plurality of modular displays disposed in a cabin and a server connected to each of the modular displays. Each of the plurality of modular displays includes a microphone that captures ambient noise in the cabin and a speaker that emits a noise reduction sound. The server instructs each of the plurality of modular displays to capture the ambient noise during a preselected flight phase. The server receives, from each of the plurality of modular displays, a digital ambient noise signal generated based on the ambient noise. The server generates for each of the plurality of modular displays a digital ambient noise reduction signal with an inverted phase of the digital ambient noise signal and a dynamic amplitude that is calculated to yield a highest level of ambient noise reduction. The server sends the digital ambient noise reduction signal to each of the plurality of modular displays. The speaker emits an ambient noise reduction sound with an inverted phase and a dynamic amplitude based on the digital ambient noise reduction signal.

In one or more embodiments, dynamic amplitude is calculated by the processor installed in the server to yield an audio level that achieves the highest level of ambient noise reduction while considering the hardware limitations of a modular display unit.

In one or more embodiments, a server in an aircraft cabin system, henceforth identified as HEU, includes a communication port that communicates with a plurality of modular displays and a processor. Each of the plurality of modular displays comprises a microphone that captures an ambient noise and a speaker that emits a noise reduction sound. The processor instructs each of the plurality of modular displays to capture the ambient noise during a preselected flight phase. The communication port receives, from each of the plurality of modular displays, a digital ambient noise signal generated based on the ambient noise. The processor generates a digital ambient noise reduction signal with an inverted phase of the digital ambient noise signal and a dynamic amplitude that is calculated to yield a highest level of ambient noise reduction. The communication port sends the digital ambient noise reduction signal to each of the plurality of modular displays. The processor instructs each of the plurality of modular displays to emit the ambient noise reduction sound with an inverted phase and a dynamic amplitude based on the digital ambient noise reduction signal One or more embodiments of the present invention provide an aircraft cabin system that can perform real-time dynamic noise reduction in the aircraft cabin during any phase of flight.

DETAILED DESCRIPTION

Embodiments of the present invention will be described in detail below with reference to the drawings. In the following description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

A cabin system according to one or more embodiments includes an Integrated Cabin System (ICS) that includes hardware and software components constituting baseline and optional cabin electronics framework on an aircraft.

As mentioned above, one or more embodiments of the invention can be employed on any other suitable cabin environment such as a train or a ship, but for purposes of illustration the embodiments are described with respect to an aircraft.

Figure 1:
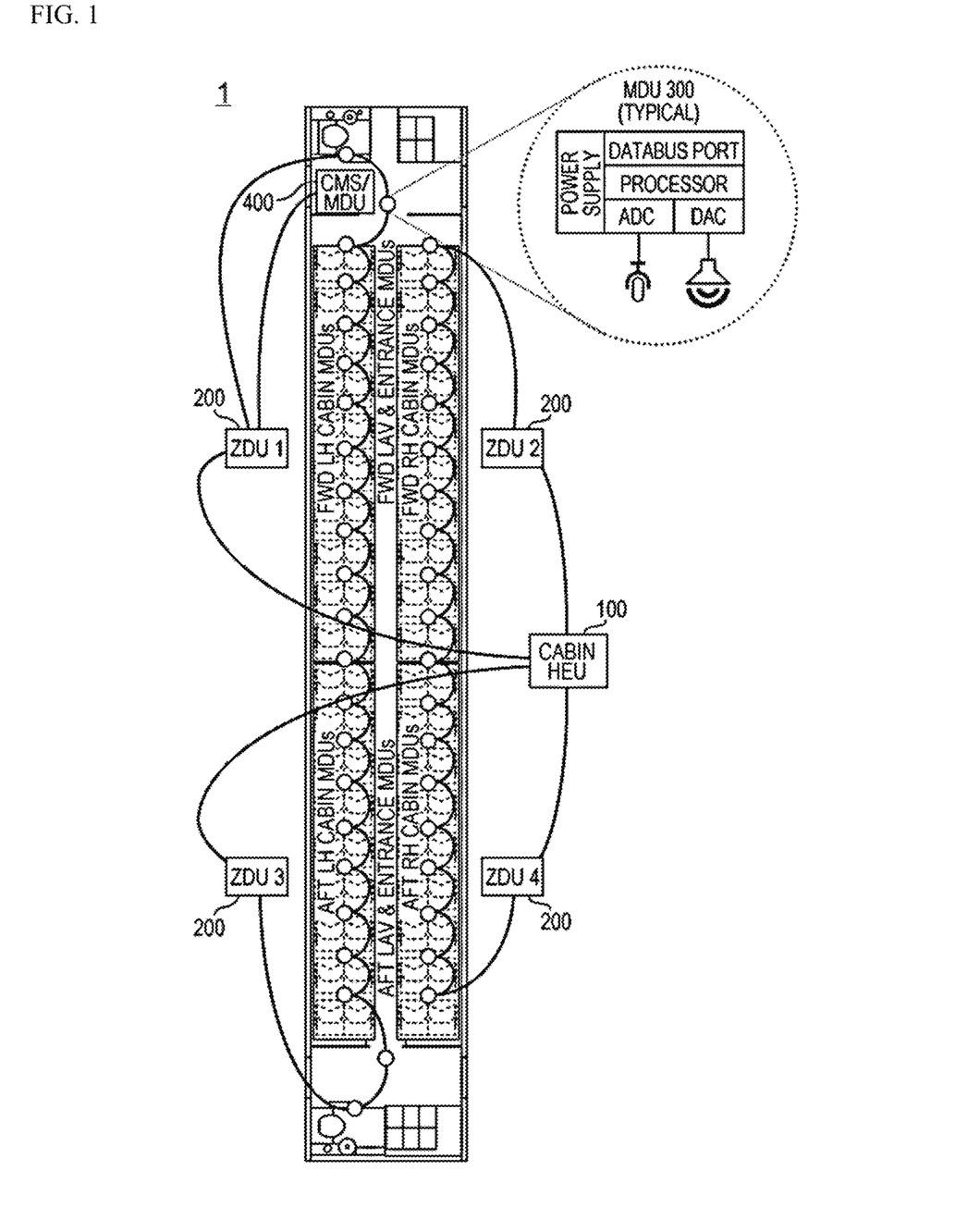
FIG. 1 shows a schematic view of a cabin system according to one or more embodiments of the present invention.
Figure 2:
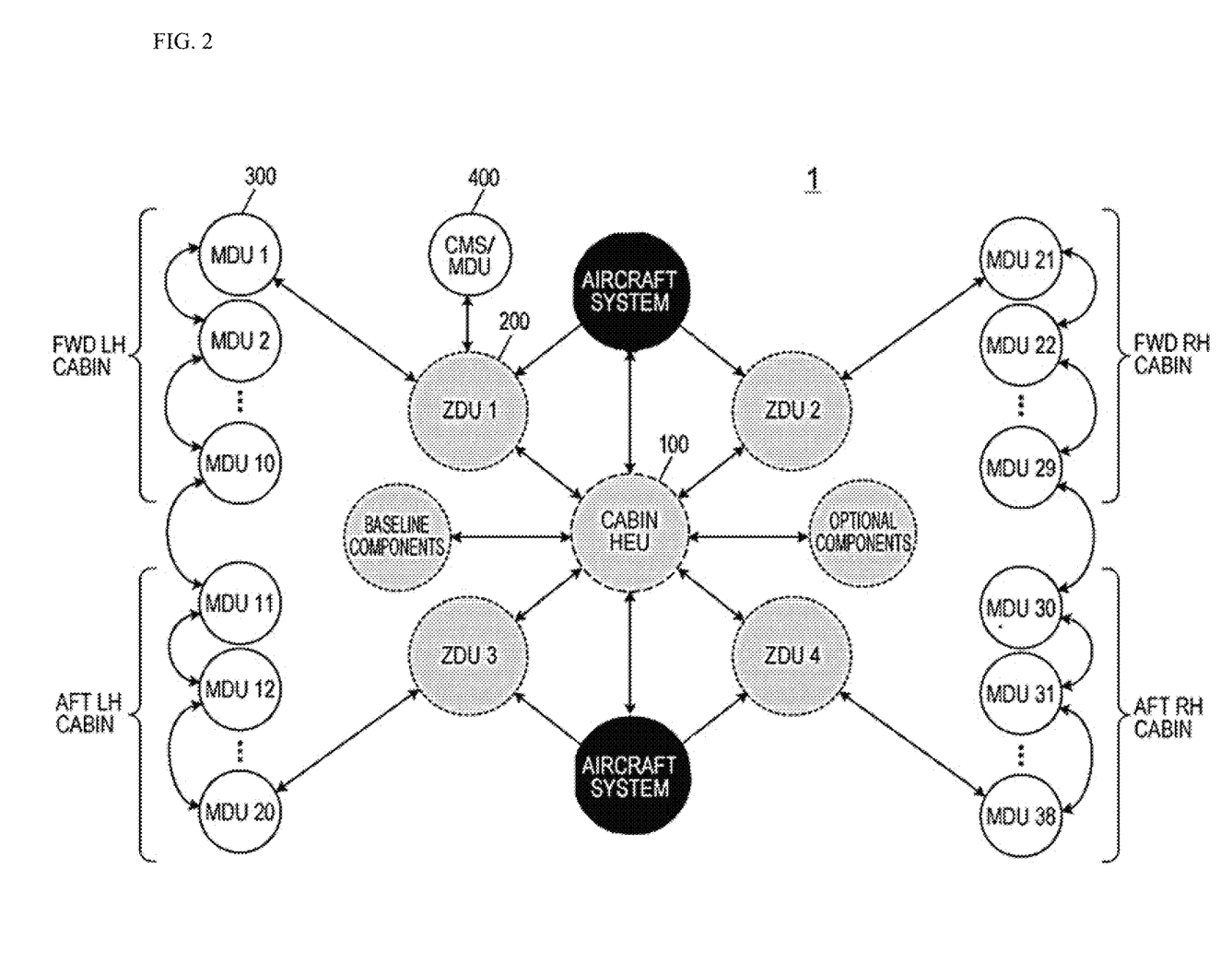
FIG. 2 shows an overall architecture of the aircraft cabin system according to one or more embodiments.

FIG. 1 shows a schematic view of a cabin system according to one or more embodiments of the present invention. FIG. 2 shows an overall architecture of the aircraft cabin system according to one or more embodiments.

As shown in FIGS. 1 and 2, the cabin system 1 includes a head end unit (HEU) 100, cabin zone distribution units (ZDUs) 200, modular display units (MDUs) 300, and a cabin management system (CMS) terminal 400 having cabin management system functions. In one or more embodiments, the CMS terminal 400 may be a type of MDU. The HEU 100, ZDUs 200, MDUs 300, and CMS terminal 400 are electrically connected to one another. Each of the MDUs 300 may include at least a microphone and a speaker.

In one or more embodiments, the HEU 100 is a server of the cabin system 1 and stores various data and software applications to be distributed via the ZDUs 200 to the MDUs 300 and the CMS terminal 400.

In one or more embodiments, the ZDUs 200 function as network hubs of the cabin system 1. The ZDUs 200 switch and control power supply among the HEU 100, MDUs 300, and CMS terminal 400. The ZDUs 200 also deliver data and software applications from the HEU 100 to the MDUs 300 and the CMS terminal 400.

In one or more embodiments, the MDUs 300 are interchangeable equipment components of the cabin system 1. Each of the MDUs 300 may comprise a dock hardwired to the network of the cabin system 1 and a display (body) that detachably couples to the dock.

In one or more embodiments, the MDUs 300, CMS terminal 400, and ZDUs 200 may communicate with each other through various means, e.g., with twisted pair Ethernet using multipath routing compliant with IEEE 802.1aq and Ethernet over twisted pair compliant with IEEE 802.3 bp, IEEE 802.3bw and/or IEEE 802.3ch standards.

In one or more embodiments, various types or models of MDUs (including the MDUs 300, CMS terminal 400, and other MDUs) may be used in the aircraft cabin. The MDUs 300, the CMS terminal 400, and other MDUs may have different sizes and functions, and may be installed at different locations from one another. For example, in one or more embodiments, the CMS terminal 400 may be installed at a cabin station, while other MDUs may be installed in a cockpit or seatback. Further, in one or more embodiments, the CMS terminal 400 may be larger than all other MDUs, while each of the MDUs 300 may be smaller than the CMS terminal 400 as well as other MDUs. Other variations in size, location, and function among the MDUs are possible without deviating from the scope of the invention.

As shown in FIG. 1, the MDUs 300 are installed: between two passenger seats; at front (FWD) and rear (AFT) entrance areas; and at front (FWD) and rear (AFT) lavatories. In this example, the cabin is divided into four zones: front left (FWD LH); front right (FWD RH); rear left (AFT LH); and rear right (AFT RH) zones. One cabin ZDU 200 per zone receives the data and software applications from the HEU 100. Then, the four cabin ZDUs 200 distribute them to the MDUs 300 at the front and the back in the right and left rows, respectively, directly or via the MDUs 300 installed at the FWD and AFT entrance areas and lavatories. The MDUs in each row may be electrically connected via a single data bus. The number of seats, the number of cabin ZDUs 200, the type of data bus, the manner the MDUs 300 are connected with the ZDUs 200 and the manner in which the cabin is divided are not limited to these illustrated embodiments.

Next, the HEU 100 according to one or more embodiments will be described.

In one or more embodiments, the HEU 100 comprises a modular cabinet with Line Replaceable Modules (LRMs), which may be a circuit card or daughter board loaded with various electrical and electronic components to execute control, sensing, and/or a recording function. The cabinet may also comprise a plurality of dedicated slots into which the LRMs are inserted, respectively.

Figure 3:
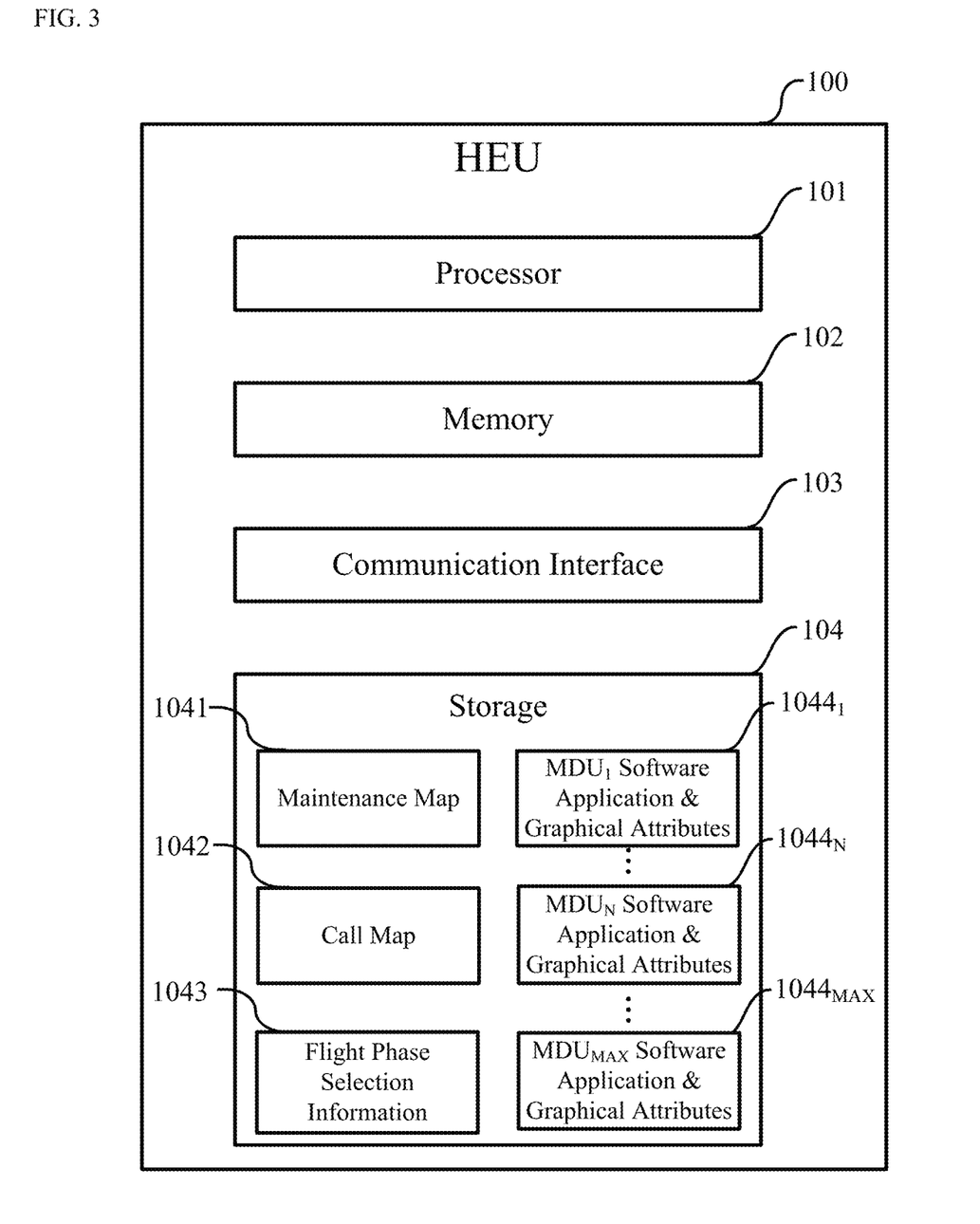
FIG. 3 shows a hardware configuration of a head end unit (HEU) according to one or more embodiments.

FIG. 3 shows a hardware configuration of the HEU 100 according to one or more embodiments. The HEU 100 comprises a processor 101, a memory 102, a communication interface 103, and a storage 104.

In one or more embodiments, the processor 101 works in conjunction with the memory 102 and communicates with all the other elements of the network through the communication interface 103; henceforth, processor 101 implies all three: processor 101, memory 102 and communication interface 103.

Figure 4:
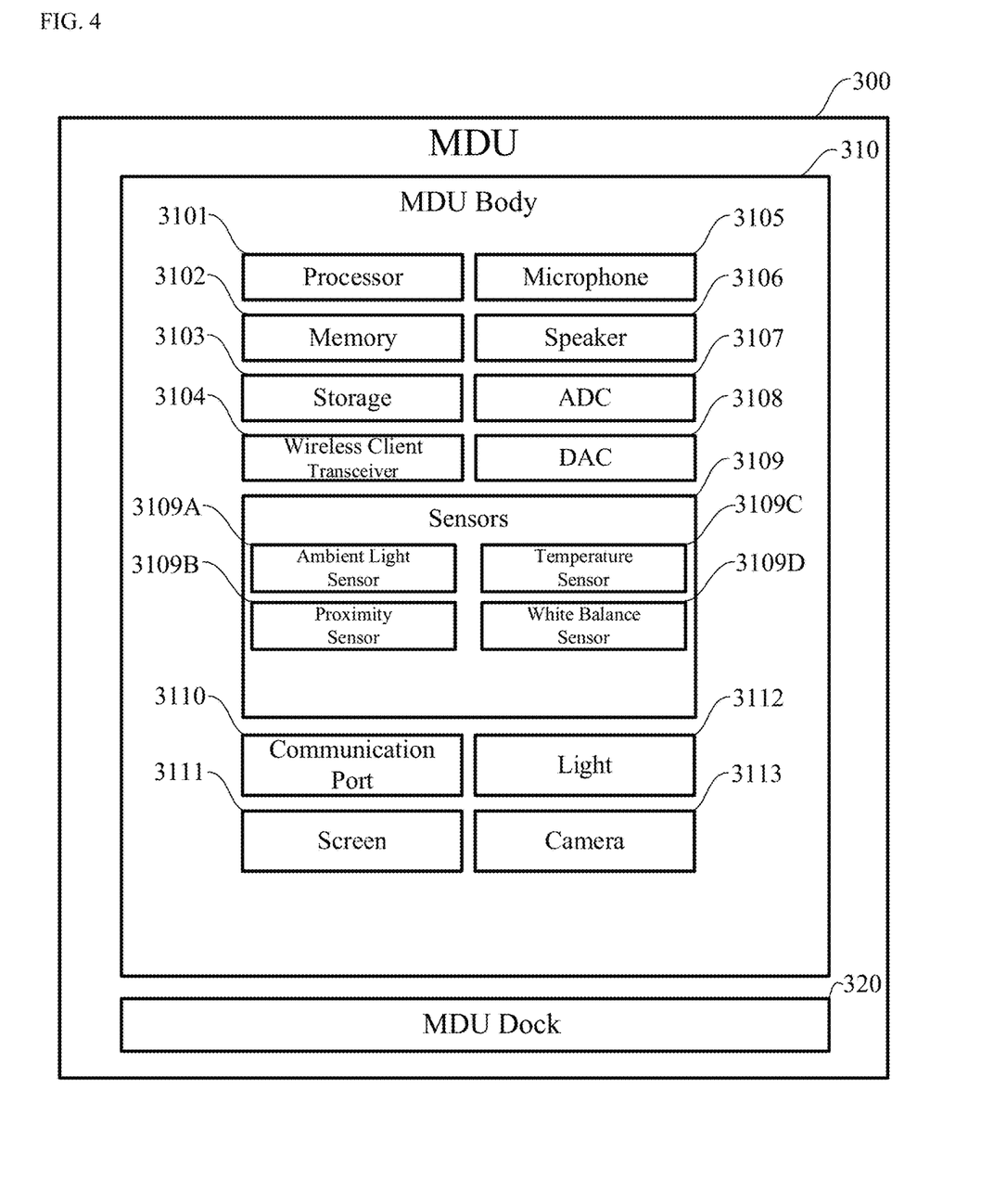
FIG. 4 shows a hardware configuration of a modular display unit (MDU) according to one or more embodiments.

In one or more embodiments, in response to a request from the MDUs $300_N$, the processor 101 transmits, from the storage 104, the configuration data $1044_N$, which includes software applications and graphical attributes relevant to the dock ID of the respective MDUs 300. MDUs 300 would request such configuration data $1044_N$ when newly installed at a certain location. The applications and graphical attributes allow users to control the functions of the MDUs 300 and to view indications and contents specific to the locations of the MDUs 300 when powered on. The processor 101 performs various functions including processing of the algorithm that creates the audio signal to be output by the MDU speakers 3106 installed throughout the aircraft cabin for noise reduction, based on the sounds captured by each MDU microphone 3105 installed in the same MDU body 310.

In one or more embodiments, the applications include at least a first application for performing user controllable functions and a second application for performing user non-controllable functions. The user controllable functions include reading lights, flight attendant call and reset, etc. that are controllable by passengers and cabin crew. The user non-controllable functions include, among other things, a moving map, a fasten-seat-belt (FSB) or return-to-seat (RTS) sign, a lavatory-occupied (LO) sign, a no-smoking (NS) sign, a cabin interphone call indication, a brightness control, a white balance control, etc. that can merely be displayed/shown on the screen 3111 but not controlled by passengers or cabin crew.

The processor 101 also monitors the MDUs 300 to detect non-responsive MDU 300 or any internal failure (e.g., broken subparts such as a light, speaker, display, sensors, camera, etc.) in the MDUs 300. When detecting non-responsive or failed MDU(s) 300, the location of such MDU(s) 300 is shown on a maintenance map 1041 sent by the processor 101.

In one or more embodiments, the HEU 100 communicates with the network including the MDUs 300 and the CMS terminal 400 via the cabin ZDUs 200, in response to the request from each of the MDUs 300.

Next, the cabin ZDUs 200 according to one or more embodiments will be described. The cabin ZDUs 200 function as backbone network switches of the cabin system 1. As shown in FIG. 2, the ZDUs 200 provide the communication between the HEU 100 and the MDUs 300, and CMS terminal 400. The cabin ZDUs 200 also control the power supply to the MDUs 300 and CMS terminal 400. Through this power control, essential cabin equipment components may be segregated from non-essential cabin equipment components to ensure compliance with safety and airworthiness regulations.

Next, the MDUs 300 according to one or more embodiments will be described. The MDUs 300 are clients of the cabin system 1. They are flexible and interchangeable equipment components that provide various information and cabin functions to passengers and cabin crew, henceforth identified as users.

As illustrated in FIG. 4, each MDU 300 comprises the MDU body 310 and the MDU dock 320. The MDU body 310 may be a lightweight touch screen device that detachably couples to any mating MDU dock 320. For example, in one or more embodiments, the MDU body 310 can couple to the MDU dock 320 that has a size matching with that of the MDU body 310.

The MDU body 310 according to one or more embodiments comprises: a processor 3101; memory 3102; storage 3103; wireless client transceiver 3104; microphone 3105; speaker 3106; Analog-to-Digital Converter (ADC) 3107; Digital-to-Analog Converter (DAC) 3108; sensors 3109; communication port 3110; screen 3111; light 3112 such as an LED light; and camera 3113 such as an Ultra High-Definition (UHD) camera.

The MDU body 310 comprises a processor 3101, which according to one or more embodiments comprises a Central Processing Unit (CPU). When the MDU body 310 is coupled to the mating MDU dock 320 and powered on, the processor 3101 requests the HEU 100 to send the configuration data $1044_N$ specific to its location (based upon the MDU dock 320 unique ID strapping). Upon receiving the configuration data $1044_N$, the processor 3101 installs it in the storage 3103, and executes processes and applications instructed by the configuration data $1044_N$. For example, the processor 3101 retrieves the Graphical User Interface (GUI) from the storage 3103 and displays it on the screen 3111

The MDU body 310 according to one or more embodiments comprises a nonvolatile memory 3102 consisting of a Random Access Memory (RAM) and a Read Only Memory (ROM). The memory 3102 s provides a workspace that temporarily stores data used by the processor 3101.

The MDU body 310 according to one or more embodiments may include a storage 3103, that stores the applications and graphical attributes relevant to the dock ID, which are received from the HEU 100 via the cabin ZDU 200.

The MDU body 310 according to one or more embodiments comprises a wireless client transceiver 3104 that wirelessly receives/transmits signals from/to remote units/devices/terminals in the cabin system 1. In one or more embodiments, the wireless transceiver may connect to the Internet.

The MDU body 310 according to one or more embodiments comprises a microphone 3105 and an Analog-to-Digital Converter (ADC) 3107. The microphone 3105 detects the ambient sound in the aircraft cabin and converts it to an electrical sound signal that is sent to the ADC 3107. The ADC 3107 converts the electrical sound signal to digital sound signals such as Ethernet digital signals.

The MDU body 310 according to one or more embodiments comprises a speaker 3106 and a Digital-to-Analog Converter (DAC) 3108. The DAC 3108 converts the digital sound signals to analog sound signals. The speaker 3106 outputs sound based on the analog signals converted by the DAC 3108.

The MDU body 310 comprises sensors 3109, which according to one or more embodiments comprises: (1) an ambient light sensor 3109A that detects ambient light around the MDU body 310 so that the processor 3101 can automatically control display brightness of the screen 3111 in response to a detected signal transmitted from the ambient sensor; (2) a proximity sensor 3109B that detects a user's hand and its proximity to the screen 3111 so that the processor 3101 can control the display on the screen 3111 in response to a detected signal transmitted from the proximity sensor (e.g., GUI icon(s) gets bigger as the hand approaches the screen 3111); (3) a temperature sensor 3109C that monitors an temperature around the MDU body 310 so that the processor 3101 transmits temperature information to the HEU 100; and a (4) white balance sensor 3109D that senses a color temperature so that the processor 3101 can calibrate the white balance of the screen 3111 and/or the camera 3113.

The MDU body 310 comprises a communication port 3110, which according to one or more embodiments is a power and data communication port wired to the network of the cabin system 1. The communication port 3110 enables the MDU body 310 to communicate with the ZDU0. The communication port 3110 may be referred to as a transceiver.

The MDU body 310 comprises a screen 3111, which according to one or more embodiments is a multi-touch screen device. The screen 3111 displays controllable and non-controllable functions to users, in response to operations such as touching icons appearing on the screen 3111.

The MDU 300 comprises a MDU dock 320 which according to one or more embodiments, is hardwired to the cabin system backbone network and to the ZDU 200 power. The MDU dock 320 provides to the MDU body 310 the specific ID for the installed location. In one or more embodiments, the MDU dock 320 provides also a network switch function.

Figure 5:
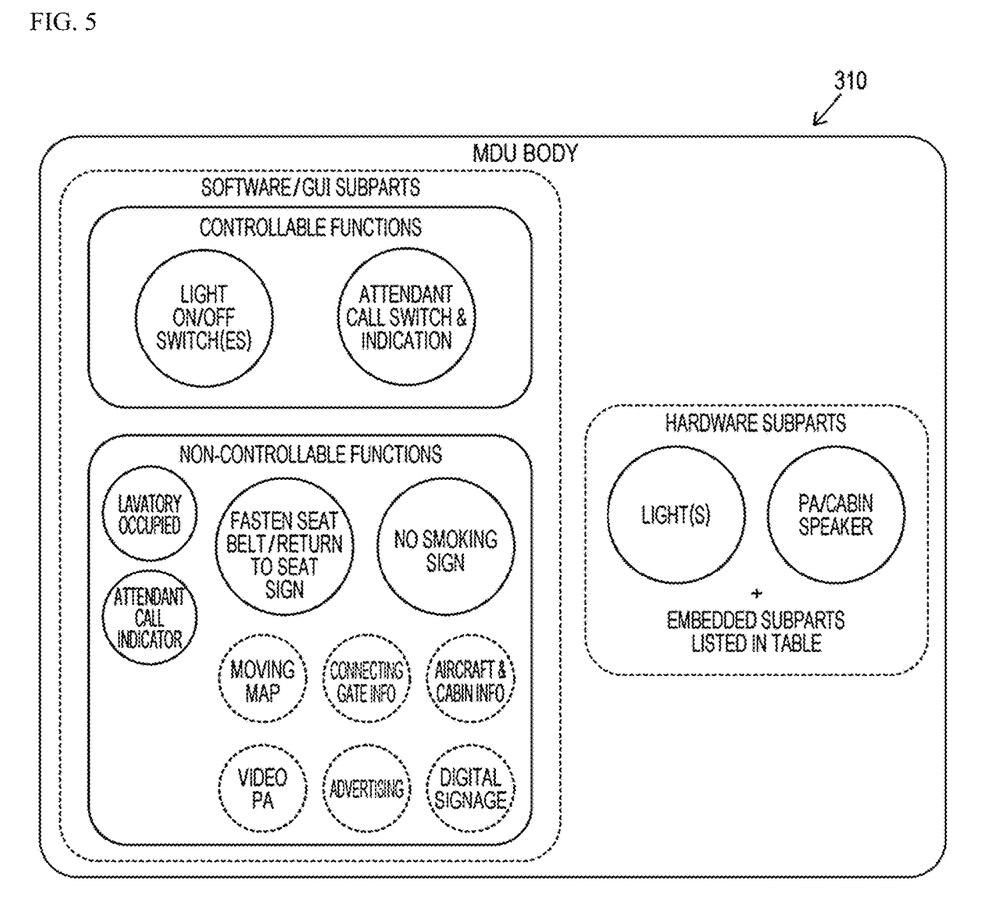
FIG. 5 shows a Graphical User Interface (GUI) with icons appearing on an MDU screen corresponding to software applications installed on an MDU body according to one or more embodiments.

FIG. 5 shows a diagram illustrating a GUI with icons appearing on the screen 3111 corresponding to the software applications installed on the MDU body 310 according to one or more embodiments.

The icons are grouped into two categories: (i) icons of user-controllable functions ("CONTROLLABLE FUNCTIONS") and (ii) icons of user-non-controllable functions ("NON-CONTROLLABLE FUNCTIONS").

The MDU 300 user-controllable functions include, e.g., turning on/off and dimming the reading light 3112, and calling a flight attendant with an icon on the screen 3111. The user controllable functions also include, e.g., resetting an active call from a passenger. In one or more embodiments, if a passenger touches the flight attendant call icon on the screen 3111, the processor 3101 sends a call signal to the HEU 100 and displays the attendant call indicator icon. The HEU processor 101 receives the message and sends to the CMS terminal 400 the call map 1042 together with the location of the MDU that initiated the call. The flight attendant can reset the call map 1042 on the CMS terminal 400 and the attendant call indicator icon on the MDU via the CMS terminal 400 or directly from the MDU.

The MDU 300 user-non-controllable functions include, e.g., displaying a FSB signor RTS sign, a LO sign, no-smoking (NS) sign, and a cabin interphone call indication on the screen 3111. The user-non-controllable functions also include, e.g., allowing a passenger to view and/or hear information such as a moving map, connecting gate information, aircraft and cabin information (e.g., PA announcements from cabin crew, and announcements from a flight deck crew), advertising, and digital signage, via the speaker 3106 and/or the screen 3111. Although not illustrated in FIG. 5, the user-non-controllable functions also include controlling the subparts of the MDU body 310 in response to a detected signal from the sensor 3109, as described above.

The dynamic cabin noise reduction is a continuous process that may be performed by the HEU processor 101 during all phases of flight, as defined by the approved user via CMS terminal 400 and stored as a Flight Phase Selection Information 1043 in the HEU Storage 104. It consists in processing the cabin ambient noise captured by the microphone 3105 installed in the MDU 300 and outputting a reverse-phase sound with dynamic amplitude (calculated amplitude) to the speaker 3106 installed in the same MDU 300. That process is performed simultaneously in all MDUs 300 installed in the aircraft cabin. In one or more embodiments, dynamic amplitude is calculated by the processor installed in the server to yield an audio level that achieves the highest level of ambient noise reduction while considering the hardware limitations of a modular display unit.

The method of dynamic cabin noise reduction according to one or more embodiments, is explained below.

Figure 6:
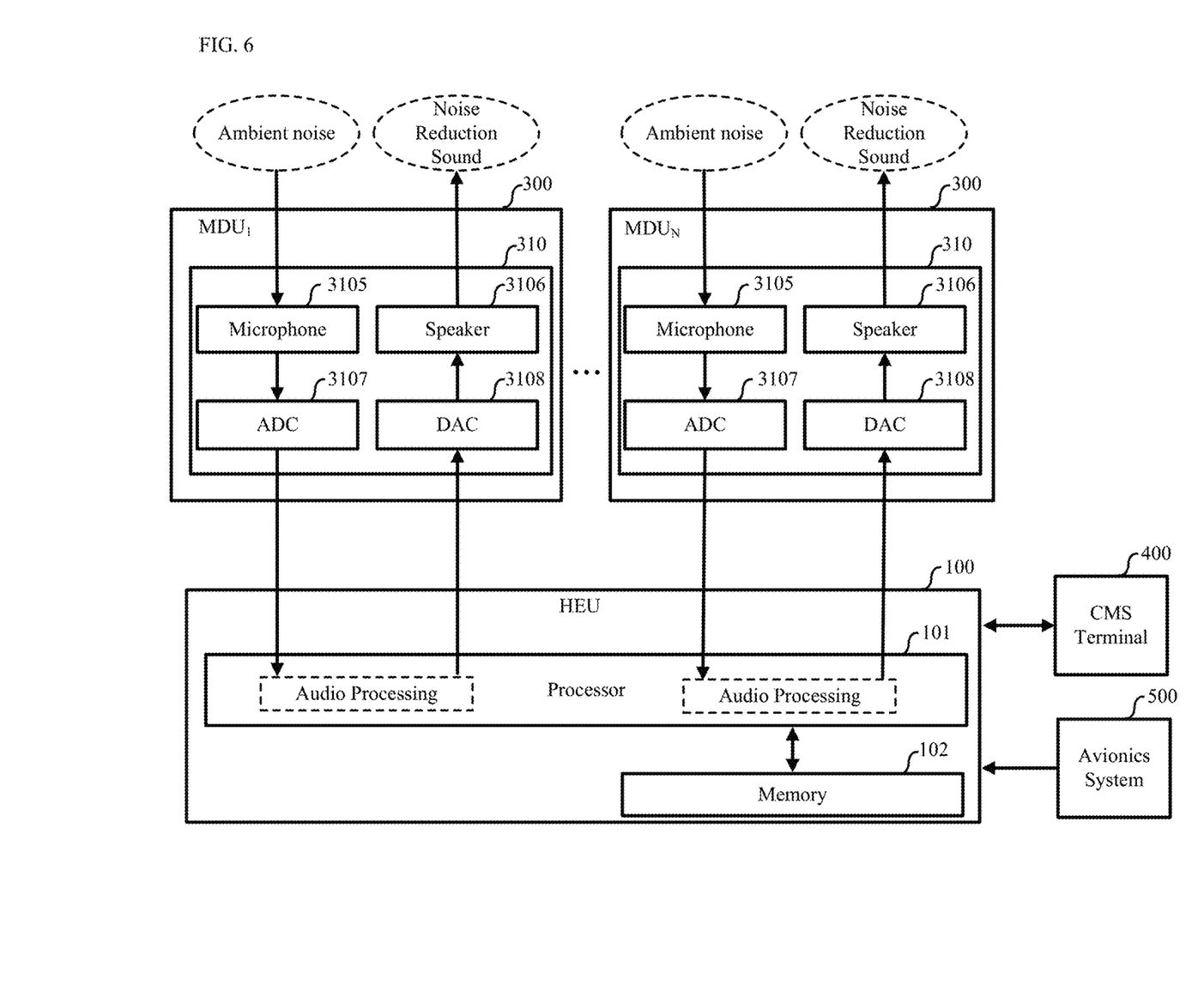
FIG. 6 shows an operations diagram for noise reduction in the aircraft cabin system according to one or more embodiments.

FIG. 6 shows an operations diagram for noise reduction in the aircraft cabin 1 system according to one or more embodiments.

As shown in FIG. 6, the HEU 100 is connected to a plurality of MDUs 300 (e.g., MDU$_1$, ..., MDU$_N$, where N is an identification number of the MDUs 300 and "MDU$_N$" indicates the N-th MDU 300), the CMS terminal 400, and an avionics system 500.

According to one or more embodiments, the microphone 3105 of each of the MDUs 300 captures ambient noise in the aircraft cabin, converts it into an analog ambient noise signal and sends it to the ADC 3107. The ADC 3107 converts the analog ambient noise signal into a digital ambient noise signal which is transmitted to the HEU 100 by the MDUs 300.

Once the digital ambient noise signals are received from the MDUs 300, the HEU processor 101 performs the phase inversion and defines the dynamic amplitude on each one of them, resulting in digital ambient noise reduction signals that are then sent to the corresponding MDUs 300. The DAC 3107 in each one of the MDUs converts the digital ambient noise signal into an analog ambient noise reduction signal that is output by the speaker 3106 as an ambient noise reduction sound.

In one or more embodiments, the HEU processor 101 monitors the flight phase of the aircraft, transmitted by the avionics system 500. For example, the flight phase may include engine start of the aircraft, aircraft pushback, aircraft taxi before take-off, take-off, climb, cruise, approach, landing, aircraft taxi after landing and engine shutdown of the aircraft.

According to one or more embodiments, when the HEU processor 101 detects a flight phase transition (hereinafter simply "transition") to a preselected flight phase, it instructs each of the MDUs 300 to start or to continue capturing the ambient noise.

Figure 7:
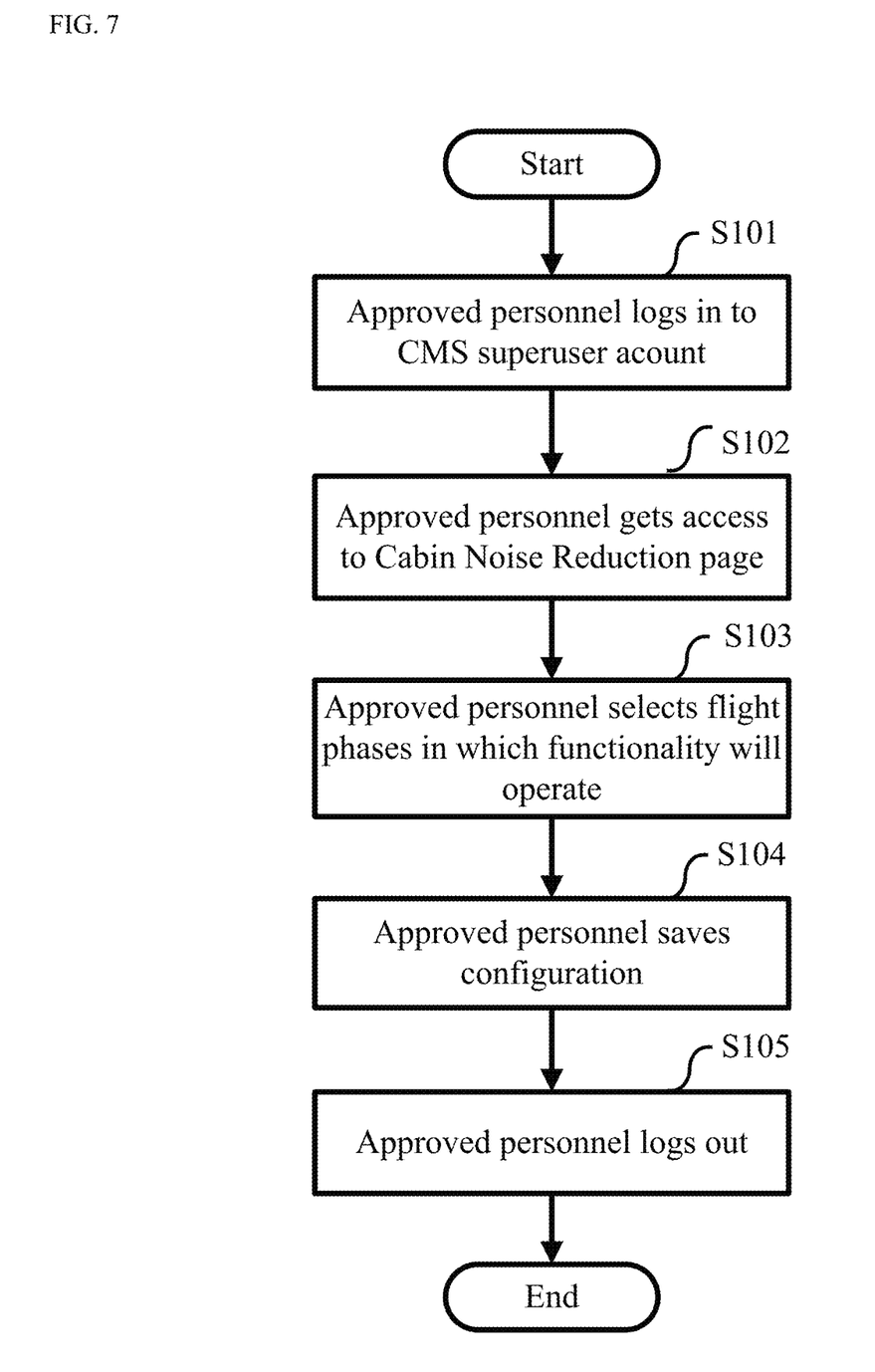
FIG. 7 shows a flowchart of a method for selecting the flight phases in which the ambient noise reduction will be active according to one or more embodiments.

FIG. 7 is a flowchart diagram showing a method of selecting the aircraft flight phases in which the cabin noise reduction will be active, according to one or more embodiments.

First, at Step 101, the approved personnel logs in to the CMS superuser account.

At Step 102, the approved personnel gets access to the cabin noise reduction page on the CMS terminal 400, which displays the Flight Phase Selection Information 1043 file stored in the HEU storage 104.

At Step 103, the approved personnel selects the flight phases in which the functionality will operate.

At Step 104, the approved personnel saves the configuration, resulting in the update of the Flight Phase Selection Information 1043 file.

At Step 105, the approved personnel logs out.

Figure 8:
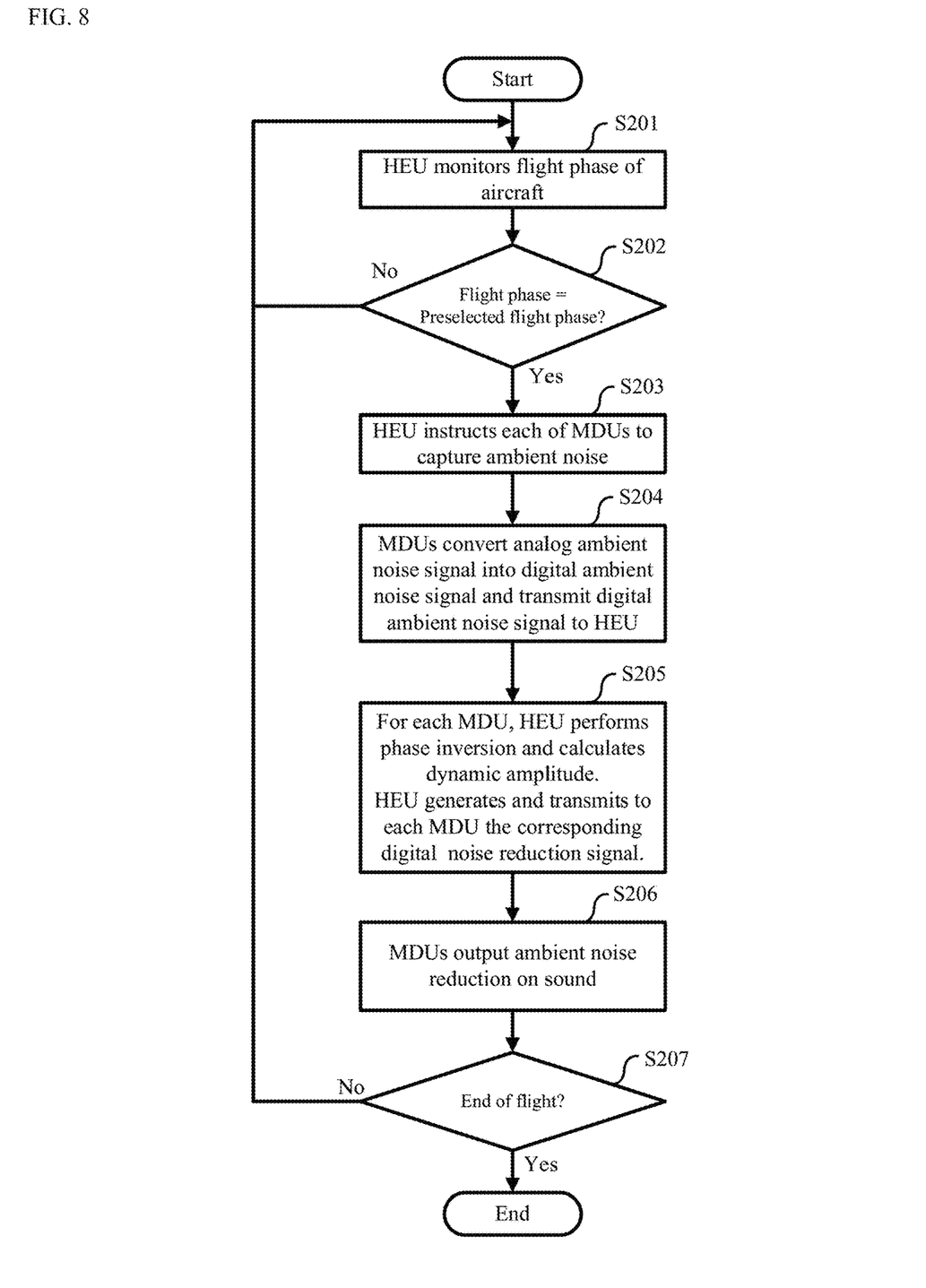
FIG. 8 shows a flowchart of a method for noise reduction in the aircraft cabin system according to one or more embodiments of another example.

FIG. 8 is a flowchart diagram showing a method of noise reduction in the aircraft cabin according to one or more embodiments.

First, at step S201, the HEU 100 monitors the flight phase of the aircraft.

At step S202, the HEU 100 determines whether the current flight phase has transitioned to a preselected flight phase. For example, the first preselected flight phase may be the engine start. If the HEU 100 does not detect the transition to a preselected flight phase, step S201 is repeated.

If the HEU 100 detects the transition to a preselected flight phase, at step S203, the HEU 100 instructs each of the MDUs 300 to capture the ambient noise.

At step S204, each of the MDUs 300 convert the analog ambient noise signal into digital ambient noise signal and transmits it to the HEU 100.

At step S205, the HEU 100 performs the phase inversion and calculates the dynamic amplitude for the digital ambient noise signal captured by each MDU 300. The HEU 100 generates and sends to each MDU 300 the corresponding digital ambient noise reduction signal.

At step S206, each MDU 300 outputs the ambient noise reduction sound.

As shown at step 207, the process is performed continuously during the preselected phases of flight.

Thus, according to one or more embodiments, noise in the aircraft cabin can be dynamically reduced during all flight phases or during preselected flight phases.

Although the disclosure has been described with respect to only a limited number of embodiments, those skilled in the art, having benefit of this disclosure, will appreciate that various other embodiments may be devised without departing from the scope. Accordingly, the scope of the invention should be limited only by the attached claims.

What is claimed is:

1. An aircraft cabin system with dynamic noise reduction, comprising:
   a plurality of modular displays disposed in an aircraft cabin; and
   a server that is physically wired to each of the modular displays,
   wherein each of the plurality of modular displays comprises:
      a microphone that captures ambient noise in the aircraft cabin; and
      a speaker that emits a noise reduction sound,
   wherein the server instructs each of the plurality of modular displays to capture the ambient noise during a preselected flight phase,
   wherein the server receives, from the plurality of modular displays, digital ambient noise signals generated based on the ambient noise, respectively,
   wherein the server generates for the plurality of modular displays different digital ambient noise reduction signals, respectively,
   wherein each of the digital ambient noise reduction signals has an inverted phase of each of the digital ambient noise signals and a dynamic amplitude that is calculated to yield a highest level of ambient noise reduction,
   wherein the server sends the digital ambient noise reduction signals to the plurality of modular displays, respectively,
   wherein the speaker emits an ambient noise reduction sound with an inverted phase and a dynamic amplitude based on each of the digital ambient noise reduction signals,
   wherein the server receives flight phase information from an avionics system,
   wherein the flight phase information indicates engine start of the aircraft, aircraft pushback, aircraft taxi before take-off, take-off, climb, cruise, approach, landing, aircraft taxi after landing or engine shutdown of the aircraft, and
   wherein the preselected flight phase is determined based on the flight phase information.

2. The aircraft cabin system according to claim 1, wherein the server instructs each of the plurality of modular displays to capture the ambient noise continuously during the preselected flight phase.

3. The aircraft cabin system according to claim 1, wherein the preselected flight phase is one of engine start of the aircraft, aircraft pushback, aircraft taxi before take-off, take-off, climb, cruise, approach, landing, aircraft taxi after landing, and engine shutdown of the aircraft.

4. A server in an aircraft cabin comprising:
   a communication port that communicates with a plurality of modular displays that are physically wired to the server, wherein each of the plurality of modular displays comprises a microphone that captures an ambient noise and a speaker that emits a noise reduction sound; and
   a processor that instructs each of the plurality of modular displays to capture the ambient noise during a preselected flight phase,
   wherein the communication port receives, from the plurality of modular displays, digital ambient noise signals generated based on the ambient noise, respectively,
   wherein the processor generates different digital ambient noise reduction signals for the plurality of modular displays, respectively,
   wherein each of the digital ambient noise reduction signals has an inverted phase of each of the digital ambient noise signals and a dynamic amplitude that is calculated to yield a highest level of ambient noise reduction,
   wherein the communication port sends the digital ambient noise reduction signals to the plurality of modular displays, respectively,
   wherein the processor instructs each of the plurality of modular displays to emit an ambient noise reduction sound with an inverted phase and a dynamic amplitude based on each of the digital ambient noise reduction signals,
   wherein the communication port that receives flight phase information from an avionics system,
   wherein the flight phase information indicates engine start of the aircraft, aircraft pushback, aircraft taxi before take-off, take-off, climb, cruise, approach, landing, aircraft taxi after landing or engine shutdown of the aircraft, and
   wherein the preselected flight phase is determined based on the flight phase information.

5. The server according to claim 4, wherein the processor instructs each of the plurality of modular displays to capture the ambient noise continuously during the preselected flight phase.

6. The server according to claim 4, wherein the preselected flight phase is one of engine start of the aircraft, aircraft pushback, aircraft taxi before take-off, take-off, climb, cruise, approach, landing, aircraft taxi after landing, and engine shutdown of the aircraft.

7. An aircraft cabin system with dynamic noise reduction, comprising:
   a plurality of modular displays disposed in an aircraft cabin; and
   a server connected to each of the modular displays through one or more cabin zone distribution units, wherein the modular displays are divided into groups that are connected to a respective one of the one or more cabin zone distribution units;
   wherein each of the plurality of modular displays comprises:
      a microphone that captures ambient noise in the aircraft cabin; and
      a speaker that emits a noise reduction sound,
   wherein the server instructs each of the plurality of modular displays to capture the ambient noise during a preselected flight phase,
   wherein the server receives, from the plurality of modular displays, digital ambient noise signals generated based on the ambient noise, respectively,
   wherein the server generates for the plurality of modular displays different digital ambient noise reduction signals, respectively,
   wherein each of the digital ambient noise reduction signals has an inverted phase of each of the digital ambient noise signals and a dynamic amplitude that is calculated to yield a highest level of ambient noise reduction,
   wherein the server sends the digital ambient noise reduction signals to the plurality of modular displays, respectively,
   wherein the speaker emits an ambient noise reduction sound with an inverted phase and a dynamic amplitude based on each of the digital ambient noise reduction signals,
   wherein the server receives flight phase information from an avionics system,
   wherein the flight phase information indicates engine start of the aircraft, aircraft pushback, aircraft taxi before take-off, take-off, climb, cruise, approach, landing, aircraft taxi after landing or engine shutdown of the aircraft, and
   wherein the preselected flight phase is determined based on the flight phase information.

8. The aircraft cabin system according to claim 7, wherein the server instructs each of the plurality of modular displays to capture the ambient noise continuously during the preselected flight phase.

9. The aircraft cabin system according to claim 7, wherein the preselected flight phase is one of engine start of the aircraft, aircraft pushback, aircraft taxi before take-off, take-off, climb, cruise, approach, landing, aircraft taxi after landing, and engine shutdown of the aircraft.

10. A server in an aircraft cabin comprising:
    a communication port that communicates with a plurality of modular displays that are connected to the server through one or more cabin zone distribution units, wherein each of the plurality of modular displays comprises a microphone that captures an ambient noise and a speaker that emits a noise reduction sound and the modular displays are divided into groups that are connected to a respective one of the one or more cabin zone distribution units; and
    a processor that instructs each of the plurality of modular displays to capture the ambient noise during a preselected flight phase,
    wherein the communication port receives, from the plurality of modular displays, digital ambient noise signals generated based on the ambient noise, respectively,
    wherein the processor generates different digital ambient noise reduction signals for the plurality of modular displays, respectively,
    wherein each of the digital ambient noise reduction signals has an inverted phase of each of the digital ambient noise signals and a dynamic amplitude that is calculated to yield a highest level of ambient noise reduction,
    wherein the communication port sends the digital ambient noise reduction signals to the plurality of modular displays, respectively,
    wherein the processor instructs each of the plurality of modular displays to emit an ambient noise reduction sound with an inverted phase and a dynamic amplitude based on each of the digital ambient noise reduction signals, wherein the communication port that receives flight phase information from an avionics system, and wherein the flight phase information indicates engine start of the aircraft, aircraft pushback, aircraft taxi before take-off, take-off, climb, cruise, approach, landing, aircraft taxi after landing or engine shutdown of the aircraft, and wherein the preselected flight phase is determined based on the flight phase information.

11. The server according to claim 10, wherein the processor instructs each of the plurality of modular displays to capture the ambient noise continuously during the preselected flight phase.

12. The server according to claim 10, wherein the preselected flight phase is one of engine start of the aircraft, aircraft pushback, aircraft taxi before take-off, take-off, climb, cruise, approach, landing, aircraft taxi after landing, and engine shutdown of the aircraft.

* * * * *